(12) United States Patent
Kozu

(10) Patent No.: US 7,597,985 B2
(45) Date of Patent: Oct. 6, 2009

(54) FUEL CELL SYSTEM

(75) Inventor: Katsumi Kozu, Hyogo (JP)

(73) Assignee: Panasonic Corporation, Osaka (JP)

( * ) Notice: Subject to any disclaimer, the term of this patent is extended or adjusted under 35 U.S.C. 154(b) by 20 days.

(21) Appl. No.: 11/709,295

(22) Filed: Feb. 22, 2007

(65) Prior Publication Data

US 2007/0212588 A1    Sep. 13, 2007

(30) Foreign Application Priority Data

Feb. 22, 2006    (JP)    ............... 2006-045507

(51) Int. Cl.
    *H01M 2/02*    (2006.01)
(52) U.S. Cl. ....................................... 429/34
(58) Field of Classification Search .............. 429/32, 429/34, 12, 13, 38
    See application file for complete search history.

(56) References Cited

U.S. PATENT DOCUMENTS

2005/0147864 A1* 7/2005 Eggum ................... 429/34

2007/0065704 A1* 3/2007 Watanabe ................ 429/34

FOREIGN PATENT DOCUMENTS

| JP | 2004-360837 | 12/2004 |
|----|-------------|---------|
| JP | 2005-5155   | 1/2005  |

OTHER PUBLICATIONS

Chinese Office Action issued in Chinese Patent Application No. 200710078992X, dated Jun. 19, 2009.

* cited by examiner

*Primary Examiner*—Patrick Ryan
*Assistant Examiner*—Monique Wills
(74) *Attorney, Agent, or Firm*—McDermott Will & Emery LLP

(57) ABSTRACT

A fuel cell system with a valve mechanism composed of valves provided to a fuel cell unit and a fuel cartridge, respectively. Part of the male valve is inserted into the female valve to cause their respective stems extending from the respective valve seal parts towards the valve ends to be pushed in so as to open the valve seal parts and to establish fluid communication. The valve mechanism ensures that no leakage occurs during disconnection of the valves by a design in which a cylindrical resilient member is fitted on the stem of the female valve such that its peripheral wall will be warped outwardly when pushed by the male valve as the valves are being connected, and liquid fuel that has remained outside the valve seal parts is sucked into the tubular space around the stem of the female valve as the valves are being disconnected.

6 Claims, 5 Drawing Sheets

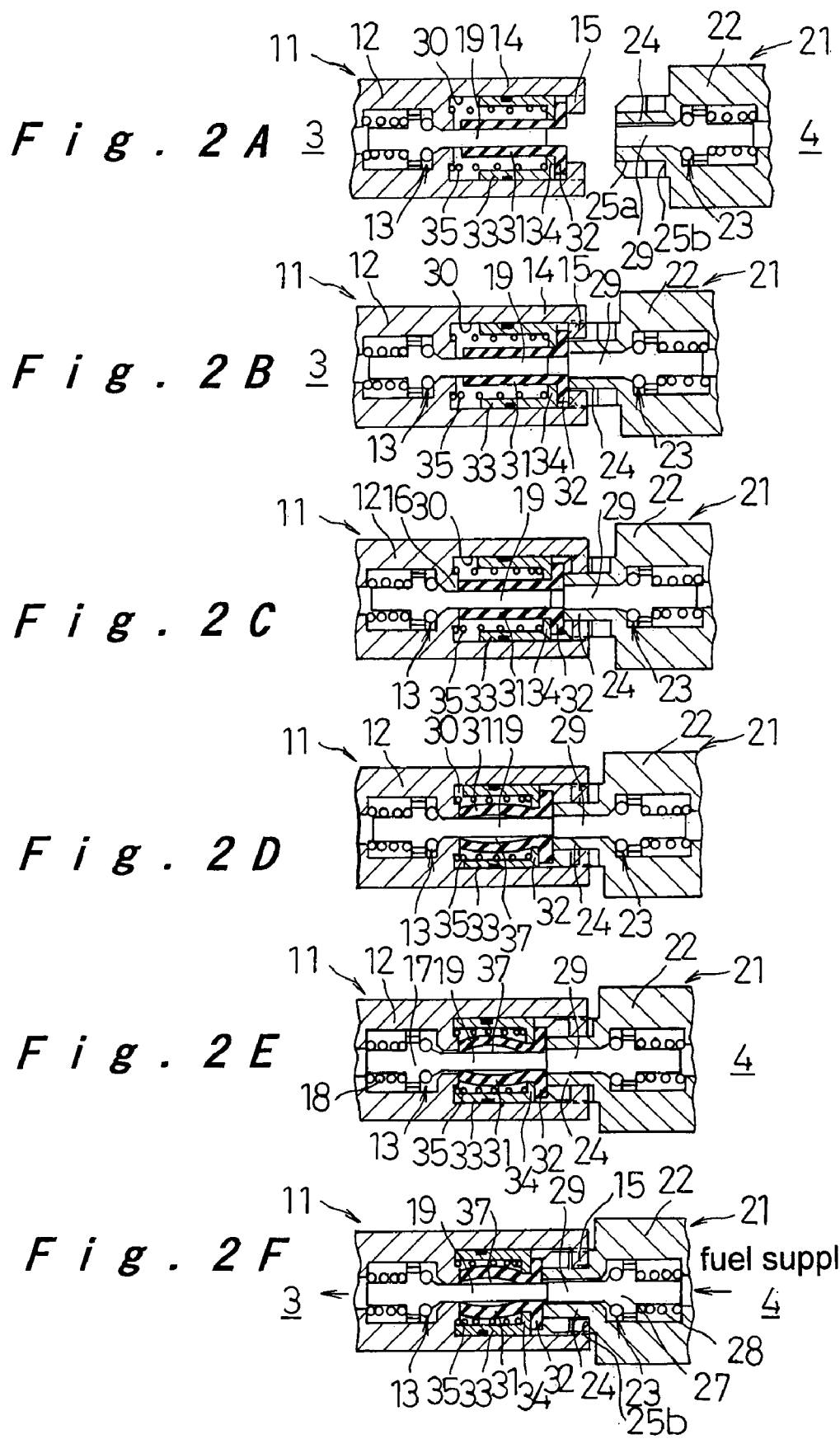

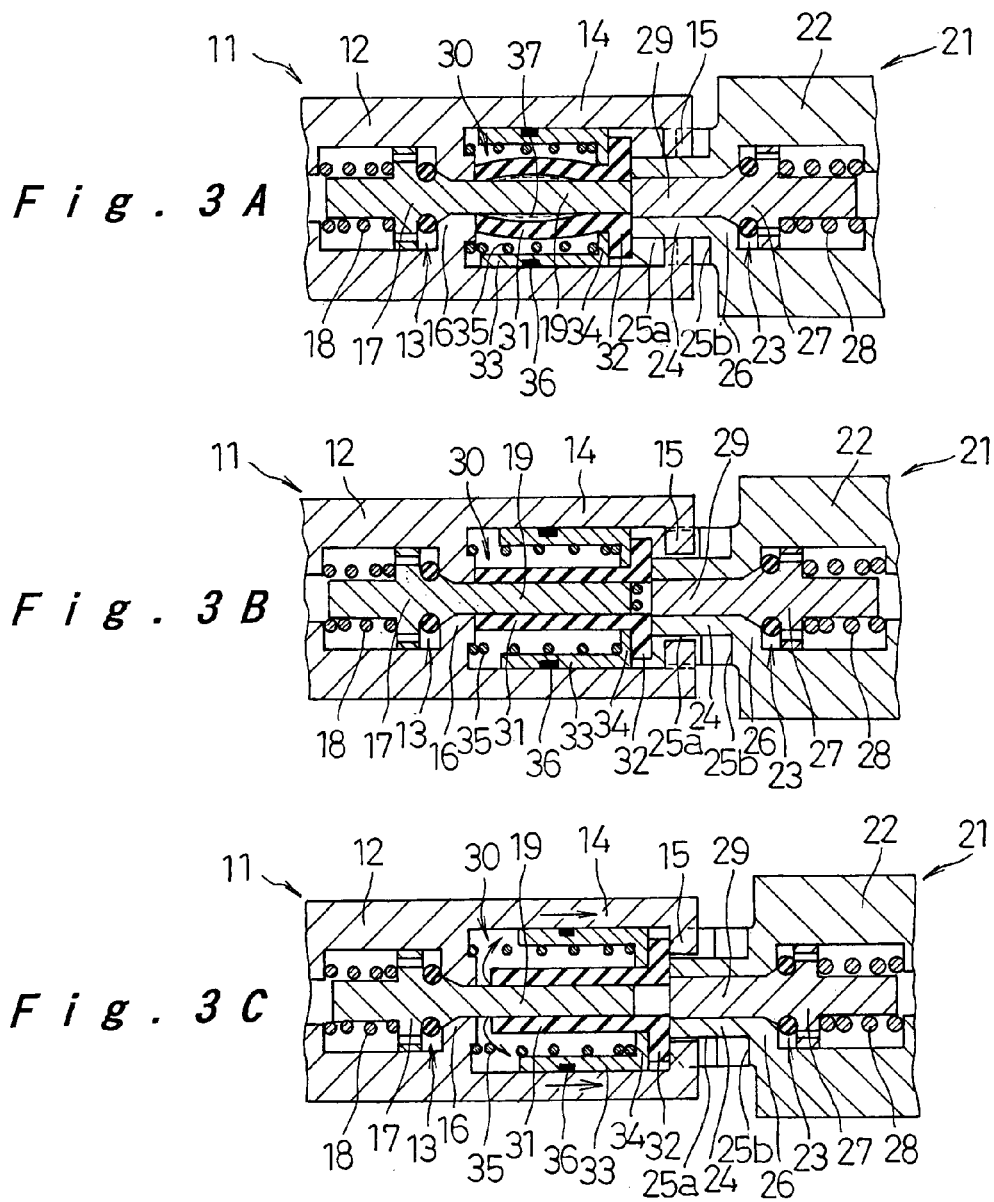

FUEL CELL SYSTEM

The present disclosure relates to subject matter contained in priority Japanese Patent Application No. 2006-45507 filed on Feb. 22, 2006, the contents of which is herein expressly incorporated by reference in its entirety.

BACKGROUND OF THE INVENTION

1. Field of the Invention

The present invention relates to fuel cell systems and more particularly to a leakage-proof valve structure that prevents leakage of liquid fuel during replenishment of the fuel cell unit in the fuel cell system with liquid fuel from a fuel cartridge.

2. Description of the Related Art

Conventionally, a fuel cell system includes a fuel cell unit containing a fuel cell module that produces electrical energy from liquid fuel, and a fuel cartridge containing liquid fuel for supplying the fuel cell unit with fuel. Fuel is supplied from the fuel cartridge to the fuel cell unit through a valve mechanism that is composed of two valves respectively provided to the fuel cell unit and the fuel cartridge, part of one valve being inserted into the other to establish fluid communication.

One type of known fuel cartridge for such a fuel cell system has a valve mechanism at one end of the container body that contains injection material such as compressed fluid with fuel. The valve mechanism has a fuel supply passage, and a stem arranged through the passage is pushed in to open the valve and to enable fuel injection through the fuel supply passage (see, for example, Japanese Patent Laid-Open Publication No. 2005-5155).

FIG. 5A and FIG. 5B illustrate a valve mechanism that is commonly used for such fuel cell system: A pair of valves are connected with each other to enable fuel supply, and disconnected from each other to stop the fluid communication. As shown, the valve mechanism generally is composed of a male valve 41 and a female valve 51 that receives the distal end of the male valve 41. The male valve 41 contains a valving element 43 that forms part of a valve seal 42, with a stem 44 extending from the valving element 43 towards the distal end. The male valve 41 further includes a flange 45 that surrounds the female valve 51 when they are connected, and a sealing member 45a arranged in the inner circumference of the flange. The female valve 51 has an inner space 55 at the distal end to receive the male valve 41, a valving element 53 that forms part of a valve seal 52, and a stem 54 extending from the valving element 53, the distal end of the stem 54 being positioned in the inner space 55. When the stem 44 of the male valve 41 abuts on the stem 54 of the female valve 51, the valving element 43 is pushed in and the valve seal 42 is opened. Similarly, when the stem 54 of the female valve 51 abuts on the stem 44 of the male valve 41, the valving element 53 is pushed in and the valve seal 52 is opened. Which one of the valve seals 42 and 52 is opened first depends on the force of the springs 46 and 56 that press the valve seals 42 and 52, respectively. In the illustrated example, the force of the spring 56 of the female valve 51, from which fuel is supplied, is stronger.

In this valve mechanism, when the valves 41 and 51 are not connected, both valve seals 42 and 52 are closed, as shown in FIG. 5A. As the male valve 41 is inserted into the inner space 55 of the female valve 51, the flange 45 of the male valve 41 fits on the female valve 51, with the sealing member 45a providing a seal between the inner surface of the flange 45 and the outer surface of the female valve 51. Then the stem 44 of the male valve 41 is pushed by the stem 54 of the female valve 51 because the force of the spring 46 is weaker than that of the female side, whereby the valving element 43 is pushed in and the valve seal 42 is opened. As the male valve 41 is inserted further into the inner space 55 of the female valve 51, the stem 54 of the female valve 51 is pushed by the stem 44 of the male valve 41, and the valving element 53 is pushed in to open the valve seal 52. Both valves 41 and 51 are thus opened, and fuel is supplied from the female valve 51 to the male valve 41. In FIG. 5B, the male valve 41 is completely inserted into the inner space 55 of the female valve 51. When the valves 41 and 51 are disconnected, the above-described process takes place in the reverse order, i.e., the supply-side female valve 51 is closed first, and then the male valve 41 is closed, after which the sealed space formed by the sealing member 45a between both valves 41 and 51 is opened up.

This valve mechanism shown in FIG. 5A and FIG. 5B has the following problem when applied to the connection between the fuel cell unit and the fuel cartridge: After the fuel supply, before both valves 41 and 51 are separated, with the valve seals 42 and 52 being closed, some fuel remains in the fuel supply passage that is formed between the valve seals 42 and 52 including the gap between the inner space 55 of the female valve 51 and the male valve 41. When the valves 41 and 51 are completely separated from each other, this remaining fuel leaks out, particularly from the inner space 55 of the female valve 51. The same problem occurs with the valve mechanism described in Japanese Patent Laid-Open Publication No. 2005-5155.

Since the most preferably used methanol fuel for fuel cells is harmful to human bodies, especially eyes, any leakage, even in a slight amount, in a place where human hand contact is possible, is considered impermissible. The possibility of adverse effects is reported even with more than 0.2 cc per 10 kg body weight. Fuel cell units are used for various portable electronic devices which a small child may touch and therefore fuel leakage must absolutely be eliminated. The above valve mechanisms clearly fail this requirement.

End seal valves are being considered, which provide a seal between male and female valves by a contact between the distal end of the male valve and sealing means arranged in the inner space of the female valve, but a new valve mechanism that eliminates leakage to a sufficient extent is yet to be developed.

SUMMARY OF THE INVENTION

In light of the problems encountered by the conventional techniques, it is an object of the present invention to provide a fuel cell system with a valve mechanism that reliably prevent leakage of fuel when disconnecting valves between a fuel cell unit and a fuel cartridge.

The fuel cell system according to the present invention includes a fuel cell unit encasing a fuel cell module, a fuel cartridge containing fuel that is supplied to the fuel cell module, and a valve mechanism including valves respectively provided to the fuel cell unit and the fuel cartridge, part of one of the valves being inserted into the other valve to establish fluid communication. The one valve includes a mechanism that provides a seal between itself and the distal end of the other valve when they are connected and forms an airtight fuel passage between valve seal parts of both valves, and that sucks in liquid fuel that remains outside the valve seal parts when the valves are disconnected.

With this valve mechanism, inserting part of the other valve into the one valve establishes fluid communication between both valves and enables fuel supply from the fuel cartridge to the fuel cell unit. When connected, an airtight fuel passage is formed between the valves, from the valve seal part of the one valve to that of the other, and no fuel collects around the valve end of the other valve. When the valves are disconnected, even though the one valve has an inner space to accommodate the other valve, the amount of liquid fuel that may remain in this space outside the valve seal part is very small. Moreover, since any remaining liquid fuel is sucked in when the valves are disconnected, fuel leakage is reliably prevented.

The fuel cell system according to the present invention includes a fuel cell unit encasing a fuel cell module, a fuel cartridge containing fuel that is supplied to the fuel cell module, and a valve mechanism including valves respectively provided to the fuel cell unit and the fuel cartridge, wherein both the valves include valve seal parts and stems extending from the valve seal parts to the distal ends, these stems being mutually pushed in to open the valve seal parts and to establish fluid communication when part of one of the valves is inserted into the other valve. The one valve includes a tubular space around the stem, and a cylindrical resilient member fitted around the stem such that the peripheral wall of the cylindrical resilient member is warped outwardly when the distal end of the other valve makes contact with the one valve and pushed in as the two valves are connected.

With this valve mechanism, inserting part of the other valve into the one valve establishes fluid communication between both valves and enables fuel supply from the fuel cartridge to the fuel cell unit. When connected, the cylindrical resilient member, with its peripheral wall being warped outwardly, creates a seal surface pressure with its restorative force to form an airtight fuel passage between the valve seal part of the one valve and the distal end of the other valve, and no fuel collects around the valve end of the other valve. When the valves are disconnected, the warped cylindrical resilient member pushes back any liquid fuel between itself and the stem as it recovers the initial shape, whereby the amount of liquid fuel that may remain outside the respective valve seal parts is extremely reduced, and thus fuel leakage is reliably prevented.

With the cylindrical resilient member being arranged such as to be movable a predetermined distance along the stem, and with a spring being provided to bias the cylindrical resilient member towards its distal end, the resilient member moves towards the valve end along the stem in the last stage when the valves are disconnected and thereby creates a gap between itself and the valve seal part to induce a vacuum flow into the tubular space, which actively sucks in any remaining liquid fuel, and thus fuel leakage is reliably prevented.

With a movable tube that slidably fits on the inner surface of the tubular space and that engages with the cylindrical resilient member at the distal end, and with the spring being engaged with this movable tube, a good seal is provided between the cylindrical resilient member and the inner surface of the tubular space, whereby the above-noted vacuum flow is reliably created, and thus fuel leakage is reliably prevented.

With the fuel cell system according to the present invention, when one of the valves of the valve mechanism is inserted into the other valve to connect the fuel cell unit and the fuel cartridge, an airtight fuel passage is formed between the valves, from the valve seal part of the one valve to that of the other valve, and no fuel collects around the valve ends. When the valves are disconnected, even though the one valve has an inner space to accommodate the other valve, the amount of liquid fuel that may remain in this space outside the valve seal part is very small. Moreover, since any remaining liquid fuel is sucked in when the valves are disconnected, fuel leakage is reliably prevented.

The above and other objects and features of the present invention will become apparent from the following description of preferred embodiments given in conjunction with the accompanying drawings.

BRIEF DESCRIPTION OF THE DRAWINGS

FIG. 2A to FIG. 2F are diagrams given in description of how the valves of the valve mechanism are connected and disconnected;

FIG. 3A to FIG. 3C are diagrams given in description of what effects are achieved when the valves are disconnected;

DETAILED DESCRIPTION OF THE PREFERRED EMBODIMENTS

One preferred embodiment of the fuel cell system of the present invention will be hereinafter described with reference to FIG. 1A to FIG. 4.

Figure 4:
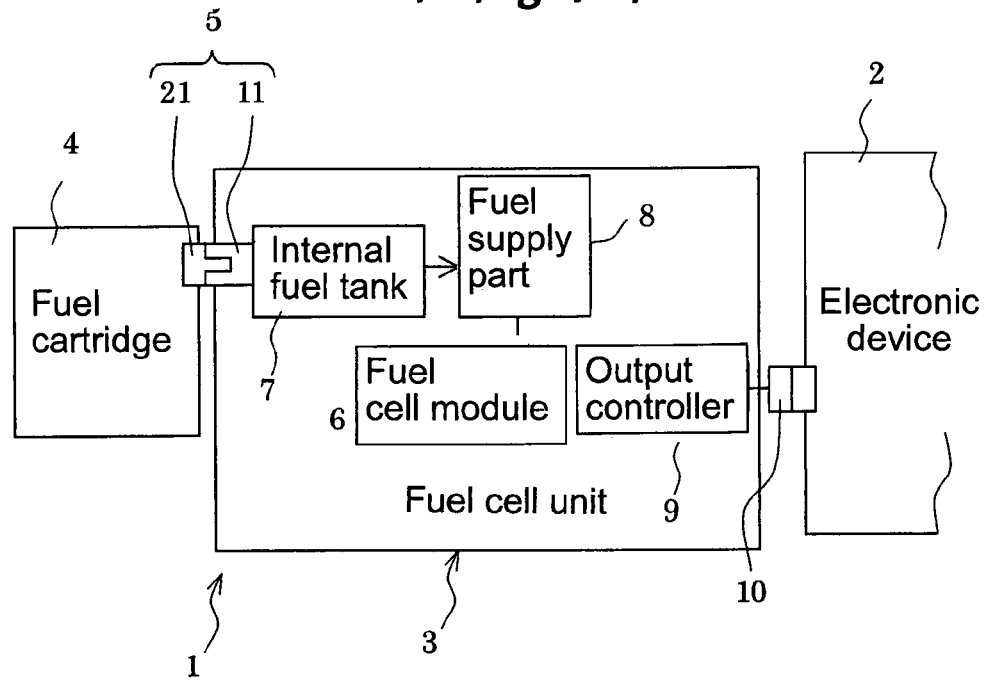
FIG. 4 is an overall schematic view of the fuel cell system of this embodiment.
Figure 5A:
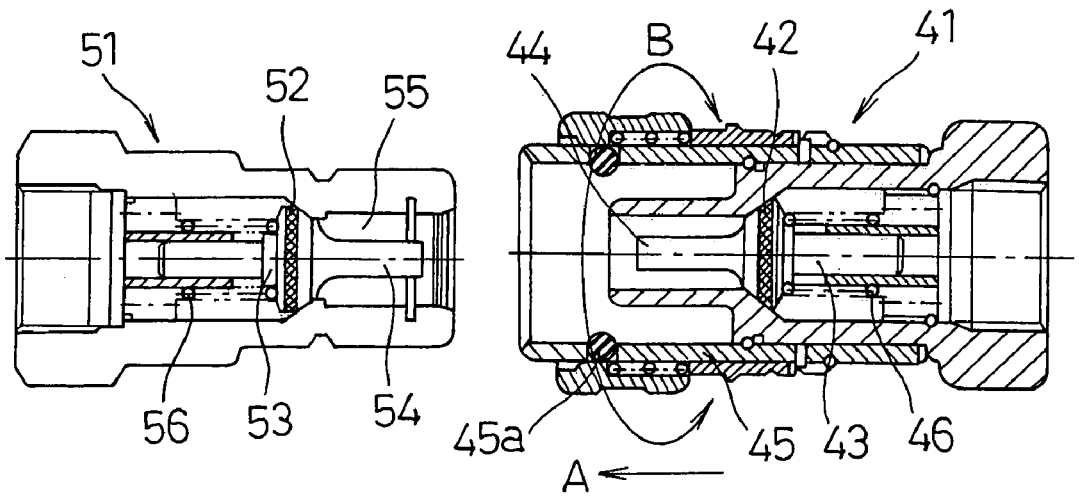
FIG. 5A and FIG. 5B are cross-sectional views of a conventional valve mechanism, FIG. 5A illustrating the disconnected state and FIG. 5B illustrating the connected state.
Figure 5B:
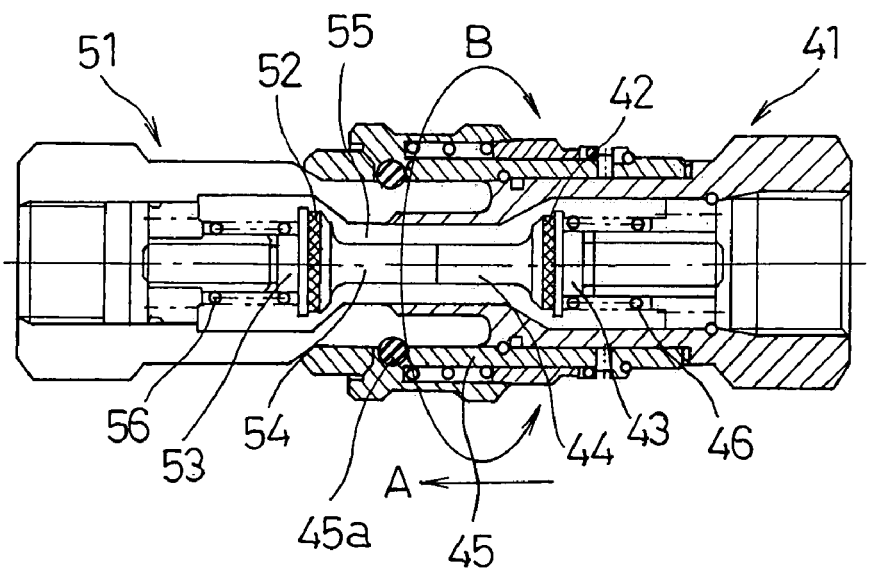

The fuel cell system 1 of the present embodiment includes a fuel cell unit 3 that supplies power to an electronic device 2 of various types, and a valve mechanism 5 for connecting the fuel cell unit 3 and a fuel cartridge 4, as shown in FIG. 4. The illustrated example of the fuel cell unit 3 includes a fuel cell module 6, which produces electrical energy from supplies of fuel such as methanol (on the anode side) and oxygen (on the cathode side) with a solid polymer electrolyte interposed between the anode and the cathode, a fuel supply part 8 that supplies fuel from an internal fuel tank 7 to the fuel cell module 6, an output controller 9 for controlling output of electrical energy produced by the fuel cell module 6, and a connector 10 for connecting the fuel cell unit 3 with the electronic device 2.

The valve mechanism 5 includes a female valve 11 provided to the fuel inlet of the fuel cell unit 3, and a male valve 21 provided to the fuel cartridge 4. Part of the male valve 21 is inserted into the female valve 11 to establish fluid communication and to replenish the internal fuel tank 7 in the fuel cell unit 3 with methanol fuel from the fuel cartridge 4.

Figure 1A:
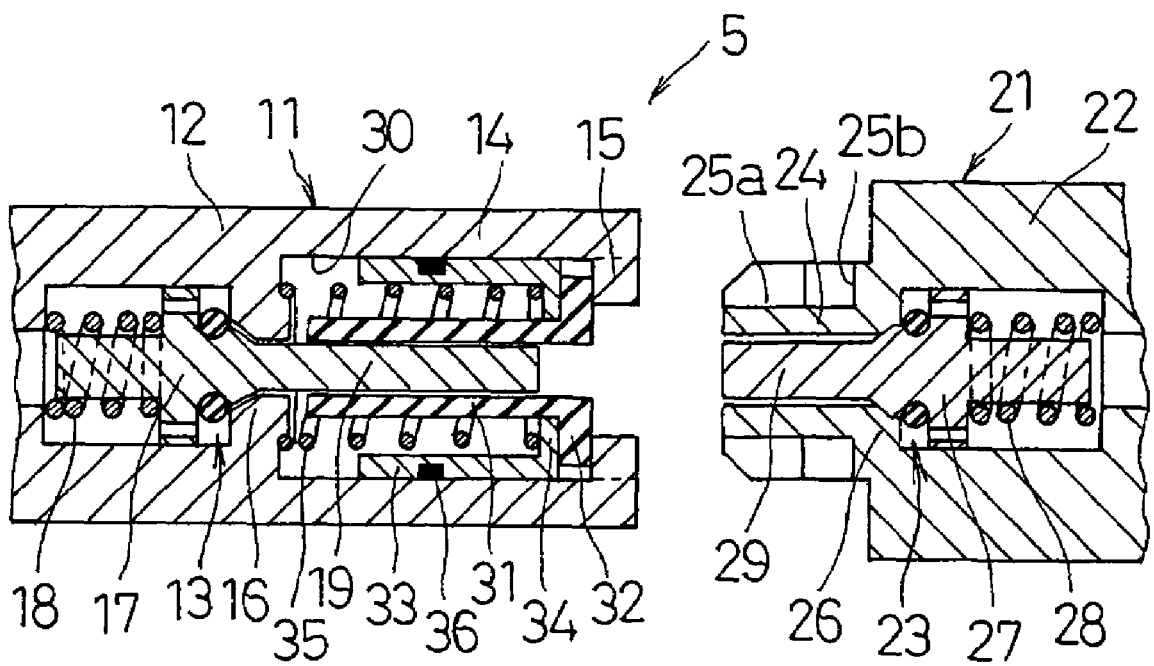
FIG. 1A and FIG. 1B are cross-sectional views of the valve mechanism in one embodiment of the fuel cell system of the present invention, FIG. 1A illustrating the disconnected state and FIG. 1B illustrating the connected state.

The valve mechanism 5 will be described in more detail next with reference to FIG. 1A and FIG. 1B. The female valve 11 includes a valve body 12 containing a valve seal part 13, a connection tube 14 extending from the valve body 12 toward the distal end, and engaging projections 15 around the inner periphery at the distal end of the tube. The valve seal part 13 is made up of a port 16 formed in the valve body 12, a valving element 17 arranged behind the port 16 for opening and closing the port 16, and a spring 18 that presses the valving element 17 towards the port 16 so that the port is normally closed. The valving element 17 includes a stem 19 protruding through the port 16 and out into the bore of the connection tube 14, with a tubular space 30 formed between the outer surface of the stem 19 and the inner surface of the connection tube 14.

The male valve 21 includes a connection protrusion 24, which is inserted into the connection tube 14 of the female valve 11. The connection protrusion 24 extends from a valve body 22 containing a valve seal part 23. On the outer surface of the connection protrusion 24 are formed axial grooves 25*a* on which the engaging projections 15 slide, and engaging grooves 25*b* radially extending from the rear ends of the grooves. The valve seal part 23 is made up of a port 26 formed in the valve body 22, a valving element 27 arranged behind the port 26 for opening and closing the port 26, and a spring 28 that presses the valving element 27 towards the port 26 so that the port is normally closed. The valving element 27 includes a stem 29 protruding through the port 26 to the distal end of the connection protrusion 24.

A cylindrical resilient member 31 is fitted on the stem 19 inside the tubular space 30 of the female valve 11. The cylindrical resilient member 31 is slightly shorter than the distance between the port 16 and the engaging projections 15, and movable a predetermined distance along the stem 19. An outward flange 32 is integrally formed at the distal end of the cylindrical resilient member 31, so that its outer surface makes contact with the tip of the male valve 21. The flange 32 also engages with the engaging projections 15 to retain the cylindrical resilient member 31 inside. A movable tube 33 slidably fits on the inner surface of the tubular space 30, with an engaging flange 34 integrally and inwardly formed at the distal end making contact with the inner surface of the flange 32 of the cylindrical resilient member 31. A spring 35 is set between the port 16 and the engaging flange 34 to bias the cylindrical resilient member 31 towards the distal end through the movable tube 33. On the outer surface of the movable tube 33 is arranged a seal ring 36 that forms a slidable seal with the inner surface of the tubular space 30.

Figure 1B:
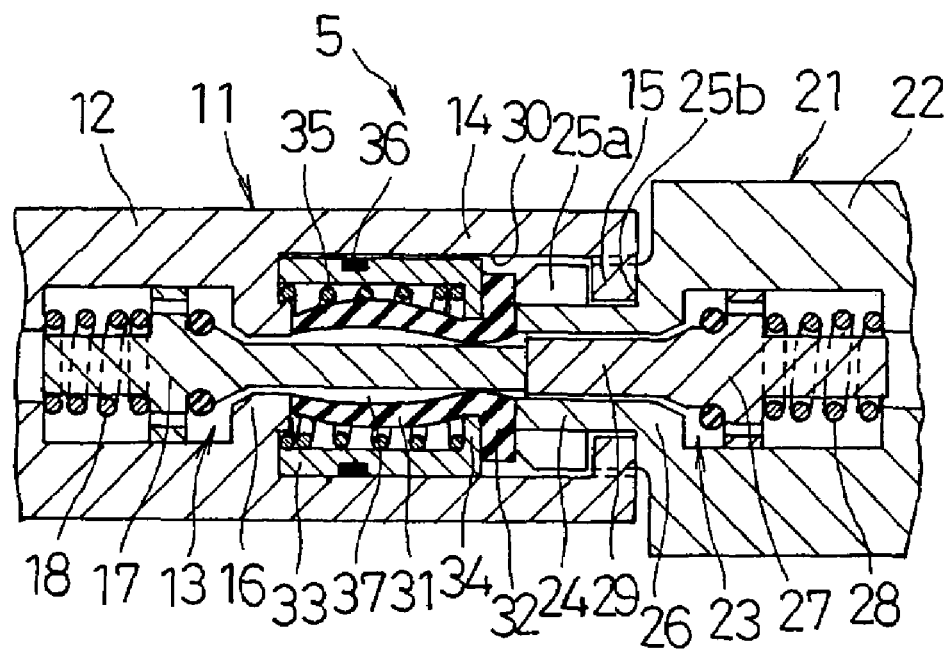

FIG. 1B shows the valve mechanism 5 in the connected state. As the connection protrusion 24 of the male valve 21 is inserted into the connection tube 14 of the female valve 11, the engaging projections 15 slide on the axial grooves 25*a* and then engage with the engaging grooves 25*b*. As shown, the distal end of the connection protrusion 24 of the male valve 21 abuts on the distal end surface of the cylindrical resilient member 31 and moves it into the connection tube 14 against the force of the spring 35 so that the rear end face of the cylindrical resilient member 31 makes contact with the port 16. The cylindrical resilient member 31 is further pressed so that its peripheral wall is warped outwardly, and the restorative force of the cylindrical resilient member ensures that its both end faces make tight contact with the port 16 and with the distal end of the connection protrusion 24. Thus, the fuel passage 37 formed between the port 16 of the female valve 11 and the port 26 of the male valve 21 is made airtight. In this process of connecting both valves, the stem 29 pushes the stem 19 to move the valving member 17 into the valve body so that the valve seal part 13 is open, and after that, the stem 19 pushes back the stem 29 to move the valving element 27 into the valve body so that the valve seal part 23 is open. Thus, fuel is supplied from the valve seal part 23 of the male valve 21 to the valve seal part 13 of the female valve 11, through the fuel passage 37 that is made up of the clearance between the inner surface of the connection protrusion 24 and the stem 29, and the clearance between the inner surface of the cylindrical resilient member 31 and the stem 19.

A description will now be given of the process of connecting and disconnecting the valves in further detail with reference to FIG. 2A to FIG. 2F. Before the connection, both valves 11 and 21 are separated, with their respective valve seal parts 13 and 23 being closed, as shown in FIG. 1A and FIG. 2A. As the male valve 21 starts entering the female valve 11, with the engaging projections 15 being fitted in the axial grooves 25*a*, the distal end of the connection protrusion 24 makes contact with the distal end of the cylindrical resilient member 31, as shown in FIG. 2B. As the male valve 21 enters further into the female valve 11, the cylindrical resilient member 31 moves backwards against the force of the spring 35, until its rear end makes contact with the port 16, as shown in FIG. 2C. With the male valve 21 being further inserted, the peripheral wall of the compressed cylindrical resilient member 31 is warped outwardly as shown in FIG. 2D, thereby forming the airtight fuel passage 37 between the valve seal parts 13 and 23. As the male valve 21 goes further, the valving element 17 is pushed back against the force of the spring 18 to open the valve seal part 13, as shown in FIG. 2E. When the male valve 21 is inserted completely, the valving element 27 is pushed back against the spring 28 to open the valve seal part 23 as shown in FIG. 2F, so that fuel can be supplied from the male valve 21 to the female valve 11 as indicated by the arrows. In this state, the male valve 21 is rotated so that the engaging projections 15 fit into the engaging grooves 25*b* to retain the connection and to allow continuous fuel supply.

After the fuel supply, the process steps described above are carried out in the reverse order (from FIG. 2F to FIG. 2A), to disconnect the valves 11 and 12. In the process in which the male valve 21 is being pulled out from the female valve 11, immediately after both valve seal parts 13 and 23 are closed, when the distal ends of the stems 19 and 29 are still in contact with each other and the peripheral wall of the cylindrical resilient member 31 is still warped outwardly so that the fuel passage 37 is airtight, as shown in FIG. 3A (or FIG. 2D), the internal volume of the fuel passage 37 is mostly occupied by the stems 19 and 29, and any remaining fuel is mainly present in the small space between the warped peripheral wall of the cylindrical resilient member 31 and the outer surfaces of the stems 19 and 29.

Next, when the distal ends of the stems 19 and 29 separate from each other, and the peripheral wall of the cylindrical resilient member 31 recovers its straight cylindrical form while the both ends are still in contact with the valve seal part 13 and the distal end of the connection protrusion 24 so that the fuel passage 37 is still closed, as shown in FIG. 3B (or FIG. 2C), part of the fuel that has remained inside the fuel passage 37 pours out into the space between the distal ends of the stems 19 and 29. However, the fuel present in this space is in a very small amount, and even if the fuel passage 37 were opened at this stage, the fuel leakage would be in a very small amount.

Next, when the male valve 21 is pulled out to a position where the distal end of the connection protrusion 24 is opposite the engaging projections 15 as shown in FIG. 3C (or FIG. 2B), with the movement of the connection protrusion 24, the cylindrical resilient member 31 moves towards the distal end of the tubular space 30 together with the movable tube 33, by the force of the spring 35, until the resilient member 31 makes contact with the engaging projections 15. This increases the volume of the airtight space formed by the cylindrical resilient member 31 and the movable tube 33 inside the tubular space 30, and a vacuum is induced between the stem 19 and the inner surface of the cylindrical resilient member 31 through a gap between the port 16 and the rear end of the resilient member 31, whereby any fuel that may have remained in a small amount inside the fuel passage 37 is completely sucked into the tubular space 30. Thus the risk of liquid fuel leakage when the male valve 21 is completely pulled out from the female valve 11 is eliminated.

According to this embodiment of the valve mechanism 5, as described above, inserting the connection protrusion 24 of the male valve 21 into the connection tube 14 of the female valve 11 establishes fluid communication between the valves 11 and 21 and enables fuel supply from the fuel cartridge 4 to the fuel cell unit 3. In this connected state, the peripheral wall of the cylindrical resilient member 31 is warped outwardly and its restorative force creates a seal surface pressure to form an airtight fuel passage 37 between the valve seal part 13 of the female valve 11 and the distal end of the male valve 21, whereby no fuel collects around the end of the male valve 21. When the valves 11 and 21 are disconnected, as the warped cylindrical resilient member 31 recovers its shape, most of the fuel between the resilient member 31 and the stem 19 is pushed back, reducing a great deal of fuel that may remain outside the valve seal part 13 of the female valve 11 after the disconnection of the valves, and thereby fuel leakage when disconnecting the valves is prevented.

Furthermore, with the cylindrical resilient member 31 being arranged movable a predetermined distance along the stem 19, and with the movable tube 33 slidably fitted to the inner surface of the tubular space 30 and engaged with the resilient member 31 and with the spring 35 at the distal end so that the resilient member 31 is biased towards its distal end by the spring 35, when the cylindrical resilient member 31 moves towards the distal end of the valve 11 along the stem 19 in the last stage of disconnection of both valves 11 and 12, the gap created between the resilient member 31 and the valve seal part 13 induces a vacuum flow into the tubular space 30, whereby any remaining liquid fuel is actively sucked into the space, ensuring that no leakage occurs.

The fuel cell system of the present invention includes the valve mechanism in which one valve is inserted into the other valve to connect the fuel cell unit with the fuel cartridge, which valve mechanism ensures that no fuel leakage occurs during disconnection of the valves by a design that reduces the amount of liquid fuel that may remain outside the valve seal part of one valve when disconnecting the valves and that causes any remaining liquid fuel to be sucked into the valve. Thus the fuel cell system is advantageously applied to portable electronic devices such as mobile phones and notebook PCs.

While preferred embodiments of the invention have been described using specific terms, such description is for illustrative purposes only, and it is to be understood that changes and variations may be made without departing from the spirit or scope of the following claims.

What is claimed is:

1. A fuel cell system comprising:
   a fuel cell unit encasing a fuel cell module;
   a fuel cartridge containing fuel that is supplied to the fuel cell module; and
   a valve mechanism including valves respectively provided to the fuel cell unit and the fuel cartridge, part of one of the valves being inserted into the other valve to establish fluid communication, wherein
   the one valve includes a mechanism that provides a seal between itself and a distal end of the other valve when they are connected and forms an airtight fuel passage between valve seal parts of both the valves, and that sucks in liquid fuel that remains outside the valve seal parts by creating negative pressure in the inner space of one of the valves in conjunction with a disconnection process when the valves are disconnected.

2. A fuel cell system comprising:
   a fuel cell unit encasing a fuel cell module;
   a fuel cartridge containing fuel that is supplied to the fuel cell module; and
   a valve mechanism including valves respectively provided to the fuel cell unit and the fuel cartridge, wherein both the valves include valve seal parts and stems extending from the valve seal parts to the distal ends, the stems being mutually pushed in to open the valve seal parts and to establish fluid communication when part of one of the valves is inserted into the other valve, wherein
   the one valve includes a tubular space around the stem, and a cylindrical resilient member fitted around the stem such that a peripheral wall of the cylindrical resilient member is warped outwardly when the distal end of the other valve makes contact with the one valve and pushed in as the valves are connected.

3. The fuel cell system according to claim 2, wherein the cylindrical resilient member is arranged such as to be movable a predetermined distance along the stem, and a spring is provided to bias the cylindrical resilient member towards a distal end thereof.

4. The fuel cell system according to claim 3, further comprising a movable tube that slidably fits on an inner surface of the tubular space and that engages with the cylindrical resilient member at the distal end with the spring being engaged with the movable tube.

5. The fuel cell system according to claim 1, wherein the mechanism that sucks in liquid fuel slidably fits on the inner surface of the tubular space that is arranged around the stem of one of the valves, and
   a movable tube that is connected to the stem of one of the valves moves towards the connection opening in conjunction with disconnection process when the valves are disconnected so as to increase the volume of the tubular space that is airtightly sealed by the movable tube.

6. The fuel cell system according to claim 5, wherein the one valve includes a tubular space around the stem, and
   a cylindrical resilient member fitted around the stem such that the peripheral wall of the cylindrical resilient member is warped outwardly when the distal end of the other valve makes contact with the one valve and pushed in as the two valves are connected,
   the movable tube is connected to the stem of one of the valves through the cylindrical resilient member, and
   the tubular space is airtightly sealed by the movable tube and the cylindrical resilient member.

* * * * *